(12) United States Patent
Chang

(10) Patent No.: US 11,124,094 B2
(45) Date of Patent: Sep. 21, 2021

(54) SEAT RECLINER FOR VEHICLE

(71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/871,753

(22) Filed: May 11, 2020

(65) Prior Publication Data

US 2020/0369183 A1 Nov. 26, 2020

(30) Foreign Application Priority Data

May 24, 2019 (KR) .......................... 10-2019-0061469

(51) Int. Cl.
*B60N 2/225* (2006.01)

(52) U.S. Cl.
CPC .......... *B60N 2/2252* (2013.01); *B60N 2/2254* (2013.01)

(58) Field of Classification Search
CPC .................................................. B60N 2/2252
See application file for complete search history.

(56) References Cited

U.S. PATENT DOCUMENTS

| 2008/0146394 A1* | 6/2008 | Schuler .................... F16H 13/06 475/162 |
| 2016/0059743 A1* | 3/2016 | Tsuji .................... B60N 2/2252 297/362 |
| 2017/0334321 A1* | 11/2017 | Suzuki ................ B60N 2/2362 |
| 2018/0134185 A1* | 5/2018 | Sakurai ............... B60N 2/2252 |

FOREIGN PATENT DOCUMENTS

| DE | 20 2005 021118 U1 | 3/2007 | |
| DE | 102010035377 A1 * | 2/2012 | ........... B60N 2/2254 |
| DE | 102010035442 A1 * | 2/2012 | ........... B60N 2/2252 |
| DE | 102012111941 A1 * | 6/2014 | ........... B60N 2/2252 |
| EP | 2586650 A2 * | 5/2013 | ........... B60N 2/2254 |
| EP | 3381743 A1 * | 10/2018 | ........... B60N 2/2227 |
| KR | 10-2017-0141334 A | 12/2017 | |
| WO | WO-03024740 A1 * | 3/2003 | ........... B60N 2/2252 |
| WO | WO-2006042647 A1 * | 4/2006 | ........... B60N 2/2358 |

* cited by examiner

*Primary Examiner* — Timothy J Brindley
(74) *Attorney, Agent, or Firm* — Novick, Kim & Lee, PLLC; Jae Youn Kim; Jihun Kim

(57) ABSTRACT

Disclosed is a seat recliner for a vehicle that includes: a gear plate having outer teeth around an outer surface; a cam part making the gear plate be eccentric by pressing an inner surface of the gear plate; an input part transmitting torque to the cam part; and a flange part having an inner side extending along a side of the input part and supporting the input part, an outer side having inner teeth engaged with the outer teeth of the gear plate, and a bridge connecting lower ends of the inner side and the outer side, in which the bridge extends such that a thickness gradually decreases toward the lower end of the outer side from the lower end of the inner side.

11 Claims, 4 Drawing Sheets

SEAT RECLINER FOR VEHICLE

CROSS REFERENCE TO RELATED APPLICATION

The present application claims priority to Korean Patent Application No. 10-2019-0061469, filed May 24, 2019, the entire contents of which is incorporated herein for all purposes by this reference.

BACKGROUND OF THE INVENTION

Field of the Invention

The present invention relates to a seat recliner for a vehicle which provides a flange part having a different thickness and shape at each portion in comparison to those of the related art by applying a new engineering method when manufacturing the flange part, thereby securing efficient local strength in the entire recliner and being greatly improved in terms of the entire size and layout in comparison to the related art.

Description of the Related Art

A seat recliner for a vehicle is classified into a manual type and an auto type. The manual type performs reclining and braking through a manual operation and the auto type performs reclining and braking through a motor.

According to these recliners, a gear plate with outer teeth eccentrically rotates inside a flange part with inner teeth, thereby decelerating.

Eccentricity of the gear plate is achieved by pushing the gear plate to a side through a cam part, and pressing the cam part and the entire rotation are achieved by an input part. That is, torque of the input part is transmitted to the gear plate through the cam part, and accordingly, the gear plate eccentrically rotates and revolves, whereby reclining is achieved with deceleration.

In the related art, the flange part of recliners were manufacturing by fine blanking, and half piercing was applied to form inner teeth. However, deep half piercing is required to secure a sufficient depth of the inner teeth of a flange, and to this end, it is necessary to use a thick raw material, so there is a problem that the weight increases.

The description provided above as a related art of the present invention is just for helping understanding the background of the present invention and should not be construed as being included in the related art known by those skilled in the art.

SUMMARY OF THE INVENTION

The present invention has been made in an effort to solve the problems and an objective of the present invention is to provide a seat recliner that provides a flange part having a different thickness and shape at each portion by applying a new engineering method when manufacturing the flange part, thereby being able to secure sufficient strength and reduce the entire size and the weight.

In order to achieve the objectives, a seat recliner for a vehicle according to the present invention includes: a gear plate having outer teeth around an outer surface; a cam part making the gear plate be eccentric by pressing an inner surface of the gear plate; an input part transmitting torque to the cam part; and a flange part having an inner side extending along a side of the input part and supporting the input part, an outer side having inner teeth engaged with the outer teeth of the gear plate, and a bridge connecting lower ends of the inner side and the outer side, in which the bridge extends such that a thickness gradually decreases toward the lower end of the outer side from the lower end of the inner side.

A hole may be formed through a center of the flange part, and the inner side may have a cylindrical shape extending upward from an edge of the hole and may support the input part while surrounding the input part with an inner surface thereof.

A side may extend downward from a center of the input part, the inner side of the flange part may surround and support the side of the input part, and the inner side of the flange part may have a thickness that is equal to or larger than a thickness of the side of the input part.

A lowermost point of the inner side of the flange part may be positioned lower than a lowermost point of the side of the input part.

The bridge of the flange part may have a flat top and a conical bottom, so a thickness of the bridge may gradually decrease outward.

The bottom of the bridge of the flange part may have an oblique cross-section.

A thickness of a portion between the bridge and the outer side of the flange part may be larger than a thickness of the inner side.

An uppermost point of the outer side of the flange part may be positioned within 2 mm up and down from an uppermost point of the inner side.

Heights of the inner teeth formed on the outer side of the flange part and the outer teeth formed on the gear plate may have a difference within 2 mm from or the same as a height of the inner side of the flange part.

An uppermost point of the outer side of the flange part, an uppermost point of the inner side of the flange part, and an uppermost point of the cam part may be positioned together within a range of 2 mm.

A thickness of the bridge of the flange part may gradually decrease with a predetermined ratio.

The bridge of the flange part may have a flat top and a stepped portion on a bottom, so a thickness thereof may gradually decrease in a stepped shape.

The stepped portion on the bottom of the bridge of the flange part may be coupled to a seat frame by welding.

The inner side, the outer side, and the bridge of the flange part may be formed by progressive cold forging.

According to the seat recliner for a vehicle, it is possible to provide a flange part having different thickness and shape at each portion by applying a new engineering method when manufacturing the flange part, thereby being able to secure sufficient strength and reduce the entire size and the weight.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
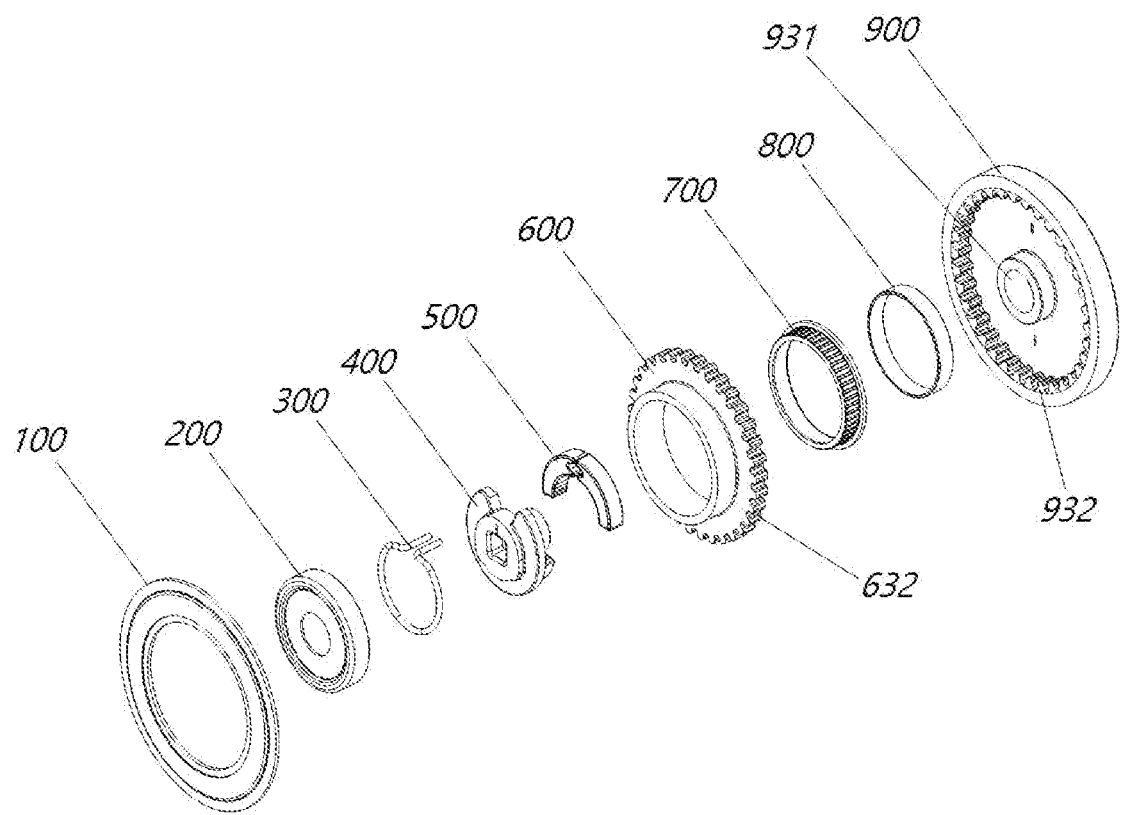
FIG. 1 is an exploded perspective view of a seat recliner for a vehicle according to an embodiment of the present invention.
Figure 2:
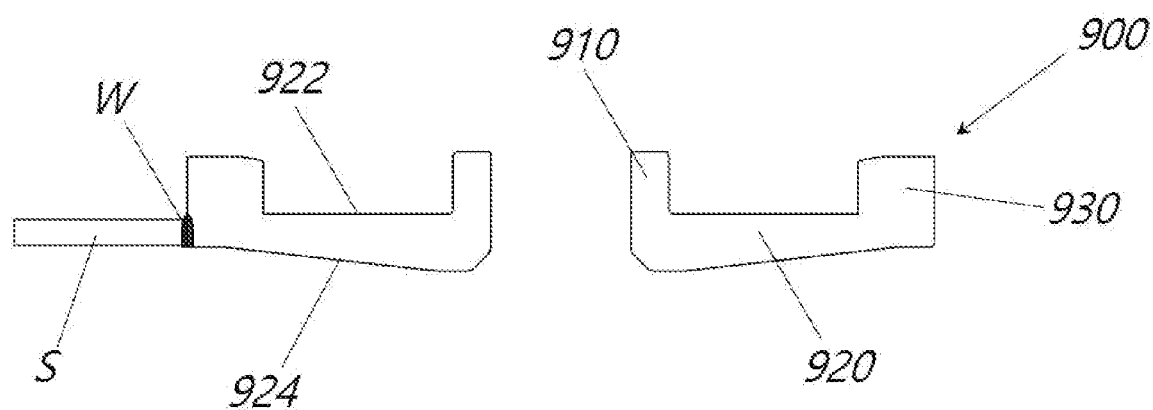
FIGS. 2 and 3 are cross-sectional views of a flange part of the seat recliner for a vehicle according to an embodiment of the present invention.
Figure 3:
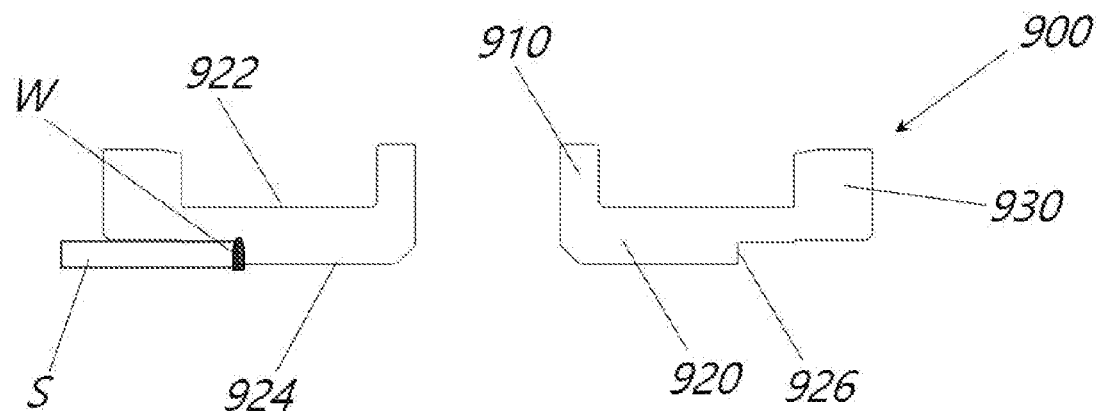
Figure 4:
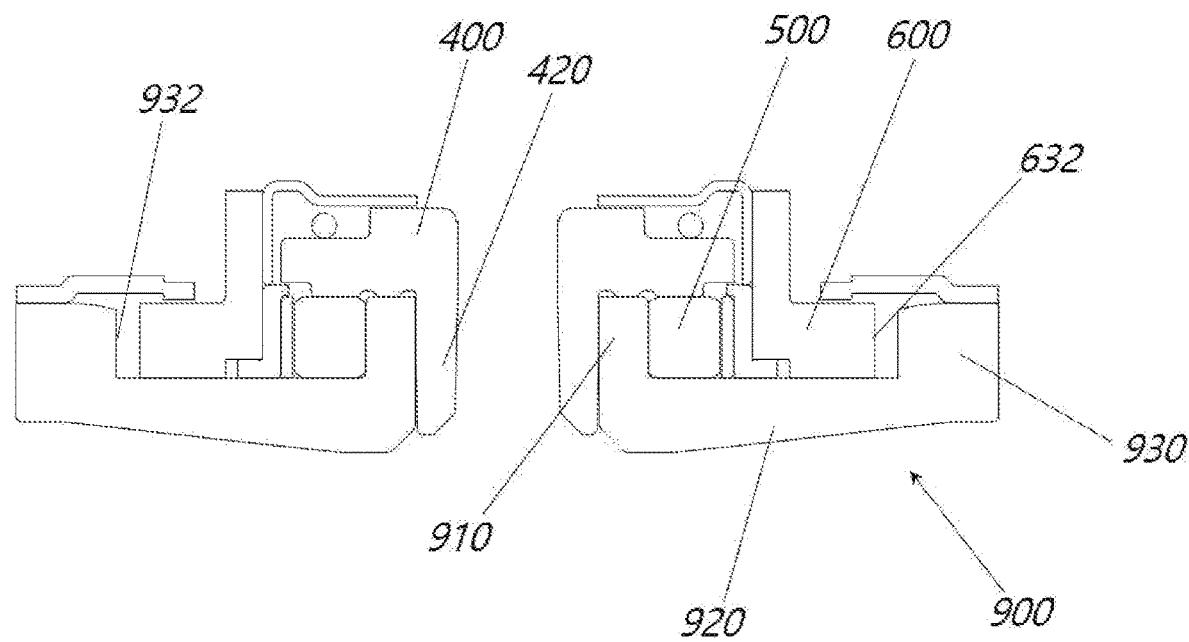
FIG. 4 is a cross-sectional view of the seat recliner for a vehicle according to an embodiment of the present invention.
Figure 5:
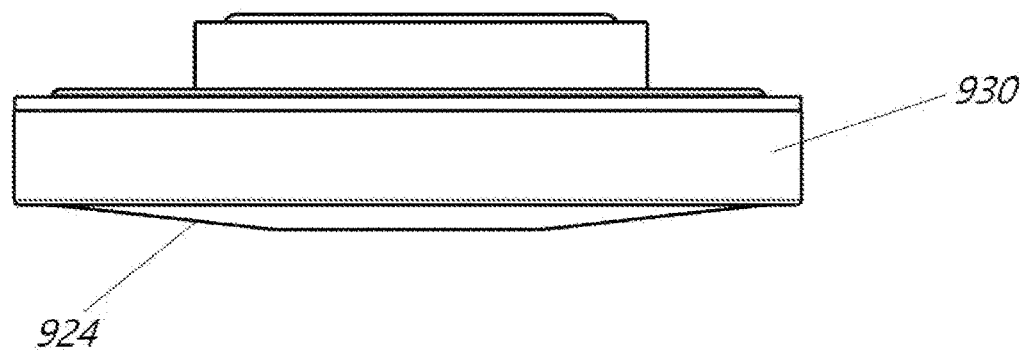
FIG. 5 is a side view of the seat recliner for a vehicle according to an embodiment of the present invention.
Figure 6:
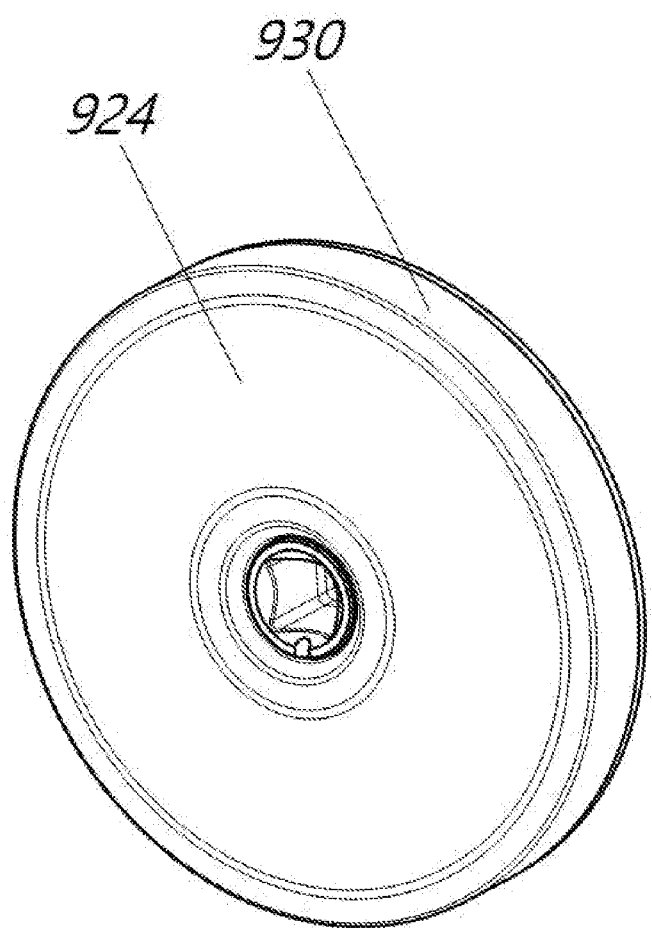
FIG. 6 is a bottom perspective view of the seat recliner for a vehicle according to an embodiment of the present invention.

FIG. 1 is an exploded perspective view of a seat recliner for a vehicle according to an embodiment of the present invention, FIGS. 2 and 3 are cross-sectional views of a flange part of the seat recliner for a vehicle according to an embodiment of the present invention, FIG. 4 is a cross-sectional view of the seat recliner for a vehicle according to an embodiment of the present invention, FIG. 5 is a side view of the seat recliner for a vehicle according to an embodiment of the present invention, and FIG. 6 is a bottom perspective view of the seat recliner for a vehicle according to an embodiment of the present invention.

A seat recliner for a vehicle according to the present invention includes: a gear plate 600 having outer teeth 632 around the outer surface; a cam part 500 making the gear plate 600 be eccentric by pressing the inner surface of the gear plate 600; an input part 400 transmitting torque to the cam part 500; and a flange part 900 having an inner side 910 extending along the side of the input part 400 and supporting the input part 400, an outer side 930 having inner teeth 932 engaged with the outer teeth 632 of the gear plate 600, and a bridge 920 connecting the lower ends of the inner side 910 and the outer side 930, in which the bridge 920 extends such that the thickness gradually decreases toward the lower end of the outer side 930 from the lower end of the inner side 910.

The seat recliner for a vehicle of the present invention makes it possible to secure rigidity at necessary points and reduce the entire size and the weight by changing the shape by changing the engineering method for the flange part 900.

In detail, FIG. 1 is an exploded perspective view of a seat recliner for a vehicle. The seat recliner for a vehicle according to the present invention includes: a gear plate 600 having outer teeth 632 around the outer surface; a cam part 500 making the gear plate 600 be eccentric by pressing the inner surface of the gear plate 600; an input part 400 transmitting torque to the cam part 500; and a flange part 900 having an inner side 910 extending along the side of the input part 400 and supporting the input part 400, an outer side 930 having inner teeth 932 engaged with the outer teeth 632 of the gear plate 600, and a bridge 920 connecting the lower ends of the inner side 910 and the outer side 930, in which the bridge 920 extends such that the thickness gradually decreases toward the lower end of the outer side 930 from the lower end of the inner side 910.

An actuator such as a motor applies torque to the input part 400. The input part 400 releases the braked cam part 500 by pressing the cam part 500 and provides torque to the gear plate 600 through a bush 800 and a ring 700. The gear plate 600 revolves and the gear plate 600 itself is eccentrically engaged with the flange part 900, so the flange part 90 rotates while decelerating. The cam part 500 is pressed to open by the spring 300, when the operation by the motor is stopped, and the cam part 500 opens and functions as a wedge, thereby performing braking. A cover 200 is coupled to the input part 400 and then a retainer 100 is coupled.

The inner side 910, outer side 930, and bridge 920 of the flange part of the present invention can be formed by progressive cold forging. Accordingly, the flange part 900 having the shape shown in FIGS. 2 and 3 can be manufactured. In detail, the flange part 900 has the inner side 910 extending along the side of the input part 400 and supporting the input part 400, the outer side 930 having inner teeth 932 engaged with the outer teeth of the gear plate 600, and the bridge 920 connecting the lower ends of the inner side 910 and the outer side 930. The bridge 920 of the flange part 900 extends such that the thickness gradually decreases from the lower end of the inner side 910 toward the lower end of the outer side 930.

According to the related art, the extension of a bridge unavoidably has a uniform thickness and the thickness unavoidably suddenly changes at the joint between the inner side and the outer side due to the characteristic of half piercing in fine blanking. In this case, stress concentrated and the strength decreases at the point where the thickness suddenly changes. Further, there is a problem that the thickness of the entire material has to be large to secure necessary thickness of teeth, so the weight increases.

According to the present invention, since the flange part 900 is formed by progress cold forging, it is possible to achieve the shape that the bridge 920 gradually decreases in thickness from the lower end of the inner side 910 toward the lower end of the outer side 930.

In detail, a hole 931 is formed through the center of the flange part 900 and the inner side 910 has a cylindrical shape extending upward from the edge of the hole 931, so the inner side 910 can support the input part 400 while surrounding the input part 400 with the inner surface thereof. Accordingly, the thickness of the inner side 910 is a very important factor to secure strength for supporting the input part 400.

In the present invention, a side 420 extends downward from the center of the input part 400 and the inner side 910 of the flange part 900 surrounds and supports the side 420 of the input part.

Further, as shown in the figures, particularly the inner side 910 of the flange part 900 may have a thickness that is equal to or larger than the thickness of the side 420 of the input part 400, so it is possible to easily secure strength at the portion through which a driving force is transmitted. According to fine blanking, the thickness of materials is limited, so it is difficult to secure a sufficient thickness for the inner side 910 of the flange part 900.

On the other hand, according to the present invention, the lowermost point of the inner side 910 of the flange part 900 may be positioned lower than the lowermost point of the side 420 of the input part 400. That is, it is possible to secure a vertical length of the inner side 910, so the input part 400 can have a larger contact area without shaking, whereby it is possible to reduce shaking and secure strength of a seat.

Further, as shown in FIGS. 5 and 6, the bridge 920 of the flange part 900 has a flat top 922 and a conical bottom 924, so the thickness of the bridge 920 can gradually decrease outward. It is possible to apply a large thickness to the inner portion of the bridge where thickness should be sufficiently secured and to apply a small thickness to the outer portion of the bridge where a large thickness is not necessary, thereby being able to decrease weight. The bottom 924 of the bridge 920 of the flange part 900 may have an oblique cross-section that inclines with a uniform slope. Accordingly, it is possible to prevent stress from concentrating at any specific point. In this case, as shown in FIG. 2, it may be possible to weld (W) the outer surface 910 of the flange part 900 to a seat frame S.

Meanwhile, as shown in FIG. 3, since the top 922 of the bridge 920 of the flange part 900 has a flat shape and a stepped portion 926 is formed on the bottom 924, the thickness can decrease in a step shape. In this case, it is possible to achieve a desired thickness at a desired point and it is also possible to weld (W) the bridge 920 of the flange part 900 to the seat frame S at the point of the stepped portion 926 of the bottom 924. Accordingly, the flange part is coupled in terms of material and locked in terms of mechanical structure to the seat frame S, so the flange part can be more firmly fixed to the seat frame S.

The thickness at the portion between the bridge 920 and the outer side 930 of the flange part 900 may be larger than the thickness of the inner side 910. As shown in FIG. 2, the thickness of the portion between the bridge 920 and the outer side 930 of the flange part 900 is continuously changed and different at each point, that is, it can be seen that the thickness of the portion between the bridge 920 and the outer side 930 of the flange part 900 is larger than the thickness of the inner side 910 at any point.

As described above, since a sufficient thickness is secured at the portion between the bridge 920 and the outer side 930 of the flange part 900, there is no section where a thickness suddenly increases and decreases, so it is possible to prevent stress concentration and secure desired strength at the portion.

On the other hand, the uppermost point of the outer side 930 of the flange part may be positioned within 2 mm up and down from the uppermost point of the inner side 910. The heights of the inner teeth 932 formed on the outer side 930 of the flange part 900 and the outer teeth 632 formed on the gear plate 600 may have a difference within 2 mm from or the same as the height of the inner side of the flange part 900. The uppermost point of the outer side 930 of the flange part 900, the uppermost point of the inner side 910 of the flange part 900, and the uppermost point of the cam part 500 may be positioned together within the range of 2 mm. This position relationship consequently enables securing a sufficient large height for the inner teeth 932 formed on the outer side 930 of the flange part and the outer teeth 632 formed on the gear plate 600, thereby being able to increase the engagement force and reduce shaking of the seat. Further, the local coupling force and the secured strength decrease the length of the bridge 920, so the entire diameter of the flange part 900 can be reduced.

According to the seat recliner for a vehicle, it is possible to provide a flange part having different thickness and shape at each portion by applying a new engineering method when manufacturing the flange part, thereby being able to secure sufficient strength and reduce the entire size and the weight.

Although the present invention was provided above in relation to specific embodiments shown in the drawings, it would be apparent to those skilled in the art that the present invention may be changed and modified in various ways without departing from the scope of the present invention, which is described in the following claims.

What is claimed is:

1. A seat recliner for a vehicle, comprising:
a gear plate having outer teeth disposed around an outer surface;
a cam part making the gear plate be eccentric by pressing an inner surface of the gear plate;
an input part transmitting torque to the cam part; and
a flange part having an inner side supporting the input part, an outer side having inner teeth engaged with the outer teeth of the gear plate, and a bridge connecting lower ends of the inner side and the outer side,
wherein the bridge extends such that a thickness gradually decreases toward the lower end of the outer side from the lower end of the inner side, and
wherein the bridge of the flange part has a flat top and a conical bottom, so the thickness of the bridge gradually decreases outward.

2. A seat recliner for a vehicle, comprising:
a gear plate having outer teeth disposed around an outer surface;
a cam part making the gear plate be eccentric by pressing an inner surface of the gear plate;
an input part transmitting torque to the cam part; and
a flange part having an inner side supporting the input part, an outer side having inner teeth engaged with the outer teeth of the gear plate, and a bridge connecting lower ends of the inner side and the outer side,
wherein the bridge extends such that a thickness gradually decreases toward the lower end of the outer side from the lower end of the inner side,
wherein the flange part includes a hole formed through a center thereof, and the inner side has a cylindrical shape extending upward from an edge of the hole and supports the input part while surrounding the input part with an inner surface thereof,
wherein the input part has a side extending downward from a center thereof, the inner side of the flange part surrounds and supports the side of the input part, and the inner side of the flange part has a thickness that is equal to or larger than a thickness of the side of the input part, and
wherein the inner side of the flange part has a lowermost point positioned lower than a lowermost point of the side of the input part.

3. The seat recliner of claim 1, wherein the bottom of the bridge of the flange part has an oblique cross-section.

4. The seat recliner of claim 1, wherein a thickness of a portion between the bridge and the outer side of the flange part is larger than a thickness of the inner side.

5. The seat recliner of claim 1, wherein the outer side of the flange part has an uppermost point positioned within 2 mm up and down from an uppermost point of the inner side.

6. The seat recliner of claim 1, wherein heights of the inner teeth formed on the outer side of the flange part and the outer teeth formed on the gear plate have a difference within 2 mm from or the same as a height of the inner side of the flange part.

7. The seat recliner of claim 1, wherein an uppermost point of the outer side of the flange part, an uppermost point of the inner side of the flange part, and an uppermost point of the cam part are positioned together within a range of 2 mm.

8. A seat recliner for a vehicle, comprising:
a gear plate having outer teeth disposed around an outer surface;
a cam part making the gear plate be eccentric by pressing an inner surface of the gear plate;
an input part transmitting torque to the cam part; and
a flange part having an inner side supporting the input part, an outer side having inner teeth engaged with the outer teeth of the gear plate, and a bridge connecting lower ends of the inner side and the outer side,
wherein the bridge extends such that a thickness gradually decreases toward the lower end of the outer side from the lower end of the inner side,
wherein the thickness of the bridge of the flange part gradually decreases with a predetermined ratio.

9. The seat recliner of claim 1, wherein the bridge of the flange part has a flat top and a stepped portion on a bottom, so the thickness thereof gradually decreases in a stepped shape.

10. The seat recliner of claim 9, wherein the stepped portion on the bottom of the bridge of the flange part is coupled to a seat frame by welding.

11. The seat recliner of claim 1, wherein the inner side, the outer side, and the bridge of the flange part are formed by progressive cold forging.

* * * * *